(12) United States Patent
Kim et al.

(10) Patent No.: US 10,496,502 B2
(45) Date of Patent: Dec. 3, 2019

(54) ONE-DIRECTION DATA TRANSMISSION/RECEPTION APPARATUS THAT RE-TRANSMITS DATA VIA PLURALITY OF COMMUNICATION LINES, AND DATA TRANSMISSION METHOD USING SAME

(71) Applicants: NNSP CO., LTD., Seoul (KR); KOREA DISTRICT HEATING CORPORATION, Seongnam-si (KR)

(72) Inventors: Ki-Hyun Kim, Yongin-si (KR); Eun Sung Na, Yongin-si (KR); Sang-Jin Lee, Seongnam-si (KR); Sun-Jin Kim, Yongin-si (KR)

(73) Assignees: NNSP CO., LTD., Seoul (KR); KOREA DISTRICT HEATING CORPORATION, Seongnam-si (KR)

( * ) Notice: Subject to any disclaimer, the term of this patent is extended or adjusted under 35 U.S.C. 154(b) by 57 days.

(21) Appl. No.: 15/525,050

(22) PCT Filed: Feb. 2, 2016

(86) PCT No.: PCT/KR2016/001138
§ 371 (c)(1),
(2) Date: May 5, 2017

(87) PCT Pub. No.: WO2016/144006
PCT Pub. Date: Sep. 15, 2016

(65) Prior Publication Data
US 2018/0285220 A1    Oct. 4, 2018

(30) Foreign Application Priority Data

Mar. 11, 2015 (KR) .......................... 10-2015-0033897

(51) Int. Cl.
*G06F 11/20* (2006.01)
*G06F 11/16* (2006.01)
*H04L 1/08* (2006.01)

(52) U.S. Cl.
CPC ...... *G06F 11/2007* (2013.01); *G06F 11/1625* (2013.01); *H04L 1/08* (2013.01); *G06F 2201/805* (2013.01); *G06F 2201/82* (2013.01)

(58) Field of Classification Search
CPC ............ G06F 11/2007; G06F 11/1625; H04L 1/1858; H04L 1/08; H04L 12/40182; H04L 45/28
See application file for complete search history.

(56) References Cited

U.S. PATENT DOCUMENTS 5,678,005 A * 10/1997 Taylor .................. G01R 31/041
709/224
6,366,557 B1 * 4/2002 Hunter .............. H04L 12/40182
370/217

(Continued)

*Primary Examiner* — Yolanda L Wilson
(74) *Attorney, Agent, or Firm* — Goldilocks Zone IP Law

(57) ABSTRACT

The present invention provides a reception apparatus for receiving data from a transmission apparatus in one direction, and a transmission apparatus for transmitting data with regards to the reception apparatus in one direction. If the reception apparatus detects an error in the received data, the reception apparatus informs the transmission apparatus about the error in the received data by switching over one or more communication lines forming a connection with the transmission apparatus. If the transmission apparatus detects a switchover of the one or more communication lines, the transmission apparatus re-transmits the data in which the error occurred to the reception apparatus. According to the present invention, the occurrence of data errors in one-direction data communication is easily recognized, and the reliability of the one-direction data communication is improved.

8 Claims, 13 Drawing Sheets

(56) References Cited

U.S. PATENT DOCUMENTS

| | | | | |
|---|---|---|---|---|
| 7,979,752 | B1* | 7/2011 | Subbiah | H04L 1/22 |
| | | | | 714/701 |
| 8,295,162 | B2* | 10/2012 | Soon | H04L 45/00 |
| | | | | 370/225 |
| 2005/0204193 | A1* | 9/2005 | Mannava | G06F 11/0745 |
| | | | | 714/18 |
| 2006/0114813 | A1* | 6/2006 | Seki | H04B 7/02 |
| | | | | 370/208 |
| 2006/0181942 | A1* | 8/2006 | Cordero | G06F 11/10 |
| | | | | 365/200 |
| 2008/0022193 | A1* | 1/2008 | Maciver | G06F 11/2007 |
| | | | | 714/800 |
| 2009/0028259 | A1* | 1/2009 | Yu | H04B 7/0689 |
| | | | | 375/260 |
| 2009/0080579 | A1* | 3/2009 | Fujii | H04B 7/0634 |
| | | | | 375/347 |
| 2010/0005358 | A1* | 1/2010 | Lim | H04L 1/1829 |
| | | | | 714/749 |
| 2011/0099446 | A1* | 4/2011 | Murakami | H04L 1/0041 |
| | | | | 714/748 |
| 2013/0154557 | A1* | 6/2013 | Lee | H04B 5/0037 |
| | | | | 320/108 |

* cited by examiner

ONE-DIRECTION DATA TRANSMISSION/RECEPTION APPARATUS THAT RE-TRANSMITS DATA VIA PLURALITY OF COMMUNICATION LINES, AND DATA TRANSMISSION METHOD USING SAME

CROSS REFERENCE TO RELATED PATENT APPLICATIONS

This application claims the benefit under 35 U.S.C. Section 371, of PCT International Application No. PCT/KR2016/001138, Feb. 2, 2016 filed, which claimed priority to Korean Patent Application No. KR 10-2015-0033897, filed Mar. 11, 2015, the disclosures of which are hereby incorporated by the references.

TECHNICAL FIELD

The present invention relates to communication technology, and more particularly, to a transmission apparatus for transmitting data in one direction to a reception apparatus, a reception apparatus for receiving data in one direction from a transmission apparatus, and a method of transmitting data in one direction using transmission and reception apparatuses.

BACKGROUND ART

Recently, data communication using a communication apparatus has been performed in a variety of fields. Data communication can be classified into various types according to communication types. For example, when two-way data communication is performed between a first communication apparatus and a second communication apparatus, the first communication apparatus can transmit data to the second communication apparatus, and the second communication apparatus can also transmit data to the first communication apparatus. In other words, when two-way data communication is performed, the two communication apparatuses can exchange data.

On the other hand, when one-way data communication is performed between a first communication apparatus and a second communication apparatus, the first communication apparatus can transmit data to the second communication apparatus, but the second communication apparatus cannot transmit data to the first communication apparatus. In other words, when one-way data communication is performed, since the first communication apparatus operates as a transmission apparatus and the second communication apparatus operates as a reception apparatus, data can be transmitted in only one direction.

A communication apparatus can receive data from another communication apparatus and determine whether there is an error in the received data. Here, there may be an error in the received data. When two-way data communication is performed, the communication apparatus can inform the other communication apparatus about the data error and transfer information on the data error. However, when one-way data communication is performed, the reception apparatus cannot transfer information on the data error to the transmission apparatus. This is because data is transmitted in only one direction.

To solve this problem in one-way data communication, several methods have been proposed. As an example, a method in which a transmission apparatus adds information that can be used for self error recovery to data and transmits the data to a reception apparatus, and when there is an error in the received data, the reception apparatus performs self error recovery with reference to the added information has been proposed. However, according to this method, it takes a long time to encode and decode information used for self error recovery, and data may be unnecessarily duplicated. Further, an error deviating from a range in which self error recovery is possible cannot be corrected.

As another example, a method in which a separate communication link is added between a transmission apparatus and a reception apparatus to transfer a result of detecting a data error from the reception apparatus to the transmission apparatus has been proposed. However, according to this method, the communication link is used in a reverse direction with respect to a communication link used for one-way data communication. Therefore, characteristics of one-way data communication deteriorate.

DISCLOSURE

Technical Problem

To solve the above problems, an apparatus and method for providing a notification of an error in received data in an easy way without degrading characteristics of one-way data communication are provided. In embodiments of the present invention, a reception apparatus that receives data in one direction can switch a communication line to inform a transmission apparatus about an error in the received data. In embodiments of the present invention, a transmission apparatus that transmits data in one direction can recognize an error in transmitted data by sensing whether a communication line has been switched. Further, the transmission apparatus can re-transmit data in which an error has occurred to a reception apparatus.

Technical Solution

One aspect of the present invention provides a reception apparatus configured to receive data in one direction from a transmission apparatus, the reception apparatus including: a reception unit configured to include a first receiver connected to a first communication line and a second receiver connected to a second communication line which is separate from the first communication line; an error detection unit configured to examine whether there is an error in target data received from the transmission apparatus via at least one of the first and second receivers; a switchover unit configured to switch at least one of a first connection between the transmission apparatus and the first receiver via the first communication line and a second connection between the transmission apparatus and the second receiver via the second communication line when the error detection unit determines that there is an error in the target data; and a received data collection unit configured to collect the target data when the error detection unit determines that there is no error in the target data.

As an embodiment, the target data may include an integrity value generated by the transmission apparatus, and the error detection unit may examine whether there is an error in the target data with reference to the integrity value.

As an embodiment, when the error detection unit determines that there is an error in the target data, the switchover unit may inform the transmission apparatus about the error in the target data by switching at least one of the first and second connections, and the reception apparatus may re-receive the target data from the transmission apparatus via at least one of the first and second receivers.

As an embodiment, the switchover unit may include a switchover circuit configured to switch at least one of the first and second connections.

As an embodiment, the switchover unit may switch the at least one of the first and second connections by cutting off power supplied to at least one of the first and second receivers or providing a function termination command to at least one of the first and second receivers.

As an embodiment, when the error detection unit determines that there is an error in the target data received via the first receiver, the switchover unit may switch the first connection, and the reception unit may re-receive the target data from the transmission apparatus via the second receiver.

Another aspect of the present invention provides a transmission apparatus configured to transmit data in one direction to a reception apparatus, the transmission apparatus including: a transmission unit configured to include a first transmitter connected to a first communication line and a second transmitter connected to a second communication line, which is separate from the first communication line; a transmission data acquisition unit configured to acquire preceding data which will be transmitted to the reception apparatus; an encoding unit configured to encode preceding data together with an integrity value used for detecting an error in the preceding data and provide the encoded preceding data to at least one of the first and second transmitters; and a switchover sensing unit configured to sense whether at least one of a first connection between the first transmitter and the reception apparatus via the first communication line and a second connection between the second transmitter and the reception apparatus via the second communication line has been switched. When the switchover sensing unit senses that at least one of the first connection and the second connection has been switched, the transmission unit and the encoding unit may perform operations for re-transmitting the preceding data to the reception apparatus.

As an embodiment, the transmission data acquisition unit may further acquire following data which will be transmitted to the reception apparatus subsequent to the preceding data. In this embodiment, when the switchover sensing unit senses that at least one of the first and second connections has been switched, the encoding unit may encode combined data including the preceding data and the following data together with an integrity value used for detecting an error in the combined data, and the transmission unit may transmit the encoded combined data to the reception apparatus via at least one of the first and second transmitters.

As an embodiment, the transmission data acquisition unit may further acquire following data which will be transmitted to the reception apparatus subsequent to the preceding data. In this embodiment, when the switchover sensing unit senses that neither of the first and second connections has been switched, the encoding unit may encode the following data together with an integrity value used for detecting an error in the following data, and the transmission unit may transmit the encoded following data to the reception apparatus via at least one of the first and second transmitters.

As an embodiment, the switchover sensing unit may include a sensing circuit configured to sense an electrical signal of at least one of the first and second communication lines.

As an embodiment, the switchover sensing unit may be implemented by providing functions of recognizing connection states of the first and second connections respectively to the first and second transmitters.

As an embodiment, the transmission unit may transmit the encoded preceding data to the reception apparatus via the first transmitter. In this embodiment, when the switchover sensing unit senses that the second connection has been switched, the encoding unit may encode retransmission data including the preceding data together with an integrity value used for detecting an error in the retransmission data, and the transmission unit may transmit the encoded retransmission data to the reception apparatus via the first transmitter.

Another aspect of the present invention provides a method of transmitting data in one direction to a reception apparatus using a transmission apparatus, the method including: acquiring first data which will be transmitted to the reception apparatus; encoding the first data together with a first integrity value used for detecting an error in the first data; transmitting the encoded first data to the reception apparatus; sensing whether at least one of a first communication line connecting the transmission apparatus and the reception apparatus and a second communication line separate from the first communication line has been switched; encoding second data including the first data together with a second integrity value used for detecting an error in the second data when it is sensed that at least one of the first communication line and the second communication line has been switched; and transmitting the encoded second data to the reception apparatus.

As an embodiment, the method of transmitting data in one direction to a reception apparatus using a transmission apparatus may further include: acquiring third data which will be transmitted to the reception apparatus subsequent to the first data; when it is sensed that neither of the first communication line and the second communication line has been switched, encoding the third data together with a third integrity value used for detecting an error in the third data; and transmitting the encoded third data to the reception apparatus.

Another aspect of the present invention provides a method of receiving data in one direction from a transmission apparatus using a reception apparatus, the method including: receiving first data from the transmission apparatus; decoding the first data and acquiring an integrity value included in the first data; examining whether there is an error in the first data with reference to the integrity value; when it is determined that there is an error in the first data, switching at least one of a first communication line connecting the transmission apparatus and the reception apparatus and a second communication line separate from the first communication line; and after at least one of the first and second communication lines is switched, receiving second data including the first data from the transmission apparatus.

As an embodiment, the method of receiving data in one direction from a transmission apparatus using a reception apparatus may further include collecting the first data when it is determined that there is no error in the first data.

As an embodiment, the receiving of the first data from the transmission apparatus may include receiving the first data via the second communication line. In this embodiment, when there is a failure in the second communication line, the switching of at least one of the first communication line and the second communication line separate from the first communication line may include switching a connection of the first communication line. Further, when there is a failure in the second communication line, the receiving of the second data including the first data from the transmission apparatus may include: restoring the switched connection of the first communication line; and receiving the second data including the first data via the restored first communication line.

Advantageous Effects

According to embodiments of the present invention, the occurrence of data errors in one-way data communication can be easily recognized. Further, since data in which an error has occurred is re-transmitted, the reliability of one-way data communication is improved. In particular, according to embodiments of the present invention, characteristics of one-way data communication do not deteriorate.

In some embodiments, an integrity value can be used for examining whether there is an error in data. In this way, in comparison with a case in which self error recovery is used, complexity of data encoding and decoding is lowered, so that calculation speed can be improved. Therefore, a time required to encode and decode data can be reduced.

BEST MODE OF THE INVENTION

Figure 2:
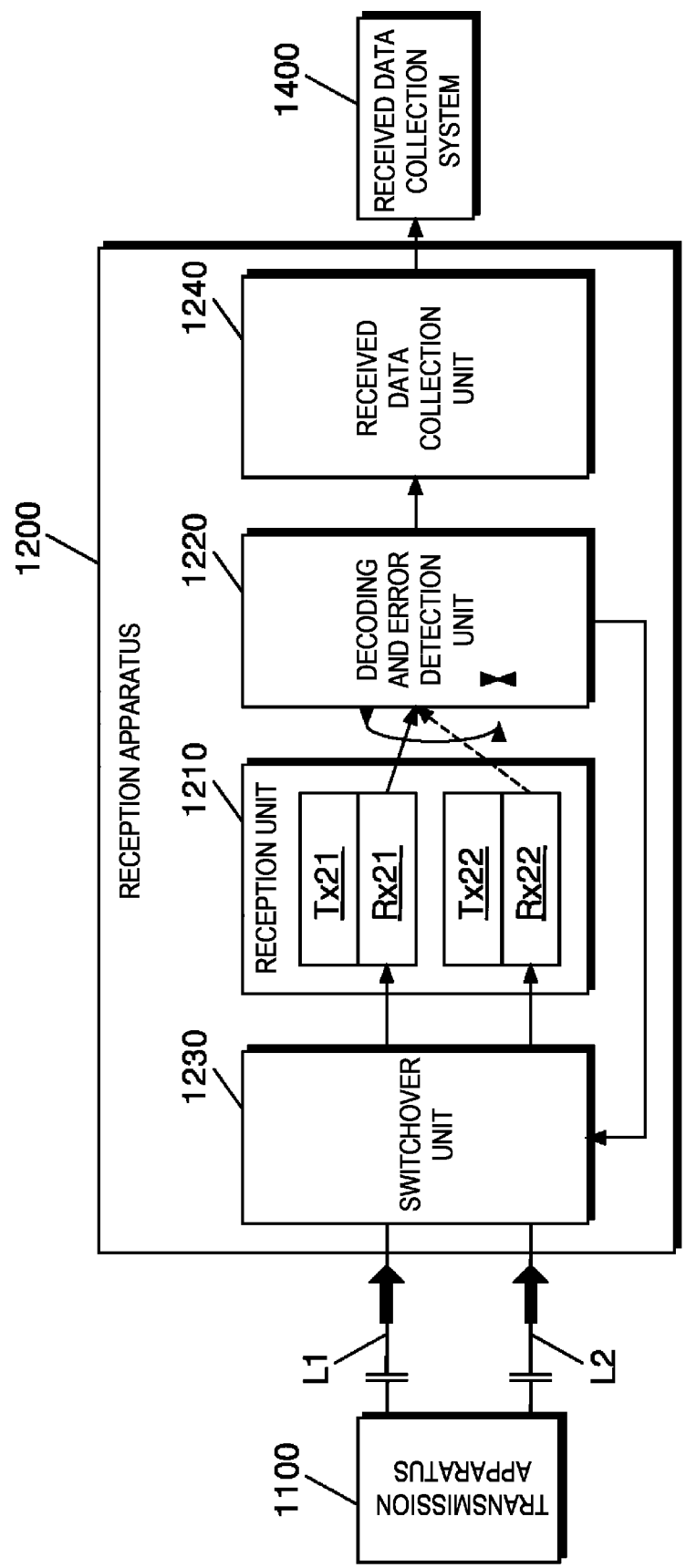
FIG. 2 is a block diagram of the reception apparatus of FIG. 1.

FIG. 2 shows the best mode for implementing the present invention.

Modes of the Invention

Both the foregoing overview and the following detailed description are examples for helping description and understanding of the present invention. In other words, the present invention is not limited to such embodiments and can be embodied in other forms. The following embodiments are mere examples for the complete disclosure of the present invention and descriptions for conveying the present invention to those of ordinary skill in the art to which the present invention pertains. Accordingly, when there are several methods for implementing components of the present invention, it is apparent that the present invention can be embodied using a specific one of the methods or the equivalent.

As used herein, when a component is referred to as including specific elements or a process is referred to as including specific operations, elements or operations other than the specific elements or operations can be further included. In other words, the terminology used herein is for the purpose of describing particular embodiments only and is not intended to be limiting of the concept of the present invention. Further, examples described to help understanding of the present invention include complementary embodiments thereof.

Terms used herein have the same meanings as commonly understood by those of ordinary skill in the art to which the present invention pertains. The generally used terms should be understood according to meanings consistent with the context herein. Also, the terms used herein should not be interpreted in an idealized or overly formal sense unless meanings thereof are clearly defined. Hereinafter, embodiments of the present invention will be described with reference to the accompanying drawings.

Figure 1:
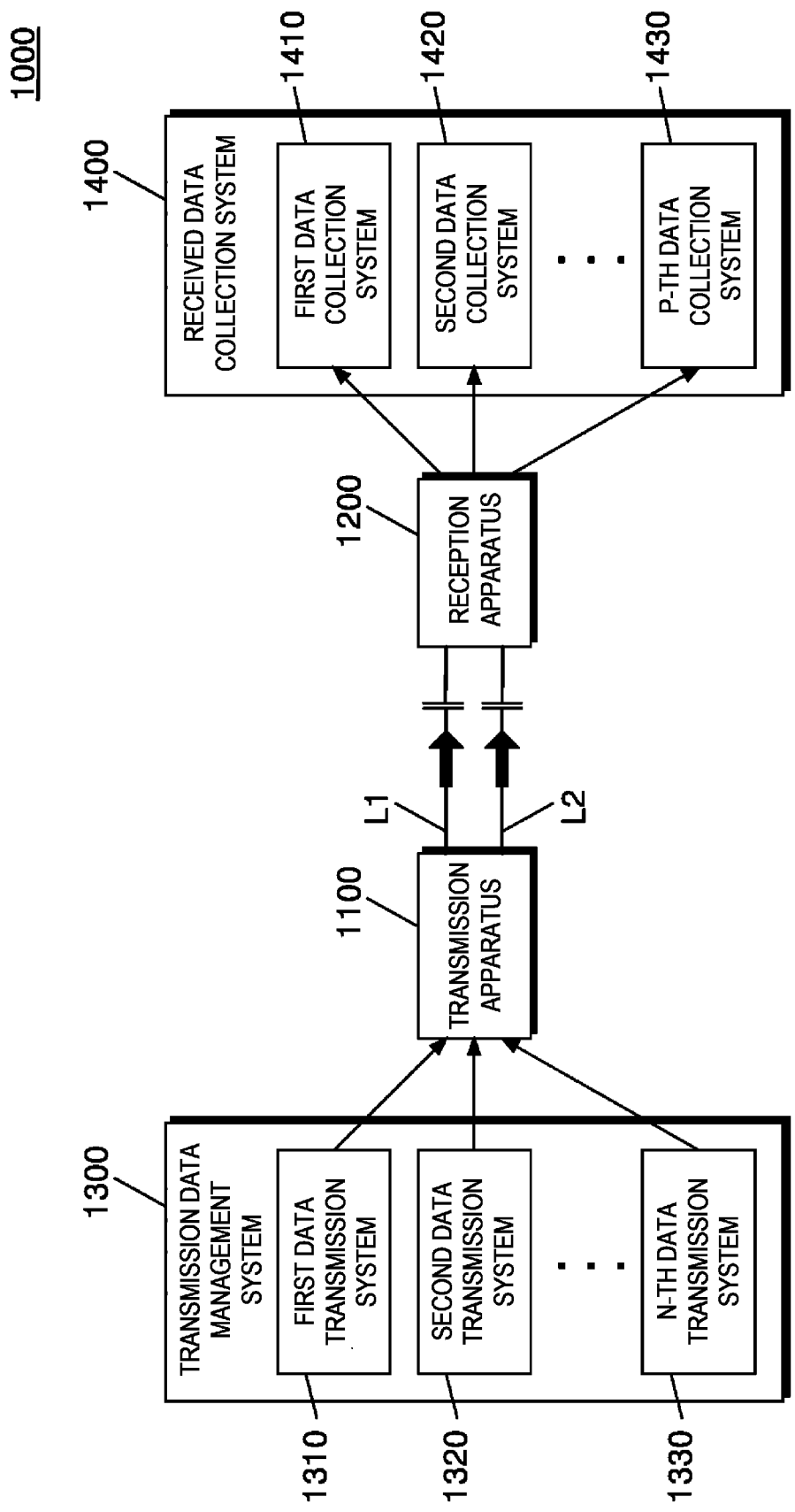
FIG. 1 is a block diagram of a one-way data communication system including a transmission apparatus and a reception apparatus according to an embodiment of the present invention.

FIG. 1 is a block diagram of a one-way data communication system including a transmission apparatus and a reception apparatus according to an embodiment of the present invention. Referring to FIG. 1, a one-way data communication system 1000 can include a transmission apparatus 1100, a reception apparatus 1200, a transmission data management system 1300, and a received data collection system 1400.

In an embodiment of the present invention, one-way data communication can be performed between the transmission apparatus 1100 and the reception apparatus 1200. The transmission apparatus 1100 can transmit data in one direction to the reception apparatus 1200. The reception apparatus 1200 can receive data in one direction from the transmission apparatus 1100. The reception apparatus 1200 cannot transmit data to the transmission apparatus 1100. To this end, the connection of a communication line for transmitting data from the transmission apparatus 1100 to the reception apparatus 1200 can be maintained. On the other hand, in an embodiment, a communication line for transmitting data from the reception apparatus 1200 to the transmission apparatus 1100 can be physically disconnected.

For example, the transmission apparatus 1100 and the reception apparatus 1200 can communicate according to one or more of communication protocols using an RJ-45 or RS-232 connector. However, the present invention is not limited to this example. In another example, the transmission apparatus 1100 and the reception apparatus 1200 can communicate according to an optical communication protocol. In still another example, the transmission apparatus 1100 and the reception apparatus 1200 can communicate according to one or more of various short-range communication protocols, such as Universal Serial Bus (USB), Firewire, and so on. Embodiments of the present invention can be variously changed or modified as necessary.

In an embodiment, the transmission apparatus 1100 and the reception apparatus 1200 can be connected via two communication lines. For example, the transmission apparatus 1100 can transmit data to the reception apparatus 1200 via at least one of a first communication line L1 and a second communication line L2 which is separate from the first communication line L1. However, the present invention is not limited to two communication lines. If necessary, three or more communication lines may be provided to connect the transmission apparatus 1100 and the reception apparatus 1200.

The transmission data management system 1300 can include one or more data transmission systems 1310, 1320, and 1330. Each of the data transmission systems 1310, 1320, and 1330 can manage data to be transferred via the transmission apparatus 1100. To transfer data from the transmission data management system 1300 to the received data collection system 1400, the transmission apparatus 1100 can acquire data from at least one of the data transmission systems 1310, 1320, and 1330.

The received data collection system 1400 can include one or more data collection systems 1410, 1420, and 1430. The reception apparatus 1200 can collect data received from the transmission apparatus 1100 and transfer the collected data to at least one of the data collection systems 1410, 1420, and 1430. Each of the data collection systems 1410, 1420, and 1430 can store the data received via the reception apparatus 1200.

FIG. 2 is a block diagram of the reception apparatus of FIG. 1. Referring to FIG. 2, the reception apparatus 1200 can include a reception unit 1210, a decoding and error detection unit 1220, a switchover unit 1230, and a received data collection unit 1240.

The reception apparatus 1200 can receive data in one direction from the transmission apparatus 1100. The reception apparatus 1200 can receive the data from the transmission apparatus 1100 via at least one of the first communication line L1 and the second communication line L2. The reception apparatus 1200 can transfer the collected data to the received data collection system 1400.

The reception unit 1210 can include two receivers Rx21 and Rx22. The first receiver Rx21 can be connected to the first communication line L1. A first connection can be established between the transmission apparatus 1100 and the first receiver Rx21 via the first communication line L1. The first receiver Rx21 can receive data transmitted from the transmission apparatus 1100 via the first communication line L1.

The second receiver Rx22 can be connected to the second communication line L2. A second connection can be established between the transmission apparatus 1100 and the second receiver Rx22 via the second communication line L2. The second receiver Rx22 can receive data transmitted from the transmission apparatus 1100 via the second communication line L2.

The reception unit 1210 can include, for example, two transmitters Tx21 and Tx22. However, the reception apparatus 1200 does not transmit data to the transmission apparatus 1100. Therefore, the transmitters Tx21 and Tx22 may not be connected to the communication lines L1 and L2 or may not operate. In some embodiments, the reception unit 1210 may not include the transmitters Tx21 and Tx22.

Data can be provided to the decoding and error detection unit 1220 from the reception unit 1210. Specifically, data received from the transmission apparatus 1100 can be provided to the decoding and error detection unit 1220 via at least one of the first receiver Rx21 and the second receiver Rx22. In some embodiments, the transmission apparatus 1100 can encode data using an encoding technique and then transmit the encoded data to the reception apparatus 1200. In these embodiments, to interpret the encoded data, the decoding and error detection unit 1220 can decode the data using a decoding technique corresponding to the encoding technique. The decoding and error detection unit 1220 can examine whether there is an error in the data (or the decoded data).

For example, when transmitting data to the reception apparatus 1200, the transmission apparatus 1100 can transmit information used for self error recovery together, and the reception apparatus 1200 can perform self error recovery to correct an error in the received data. However, it takes a long time to encode and decode the information used for self error recovery, and an error deviating from a range in which self error recovery is possible cannot be corrected.

Therefore, in embodiments of the present invention, an integrity value can be used for examining whether there is an error in data. In this way, in comparison with a case in which self error recovery is used, complexity of data encoding and decoding is lowered, and calculation speed can be improved. Therefore, a time required to encode and decode data can be reduced.

In an embodiment, the transmission apparatus 1100 can encode an integrity value together with data to be transmitted. The encoded data received by the reception apparatus 1200 can include the integrity value. The integrity value can be used for examining whether there is an error in the data.

The transmission apparatus 1100 can generate an integrity value using an integrity cipher algorithm. For example, the integrity value can include a hash value which is generated by performing a hash operation on the data. However, the present invention is not limited to this example. The integrity value can include any value that is used for detecting an error in the data, such as a parity value, a value calculated according to a cyclic redundancy check (CRC) algorithm, and so on.

In the above embodiment, the decoding and error detection unit 1220 can examine whether there is an error in the received data with reference to the integrity value included in the data. For example, when the integrity value includes a hash value, the decoding and error detection unit 1220 can determine whether an integrity value calculated by performing a hash operation on the data is identical to the received integrity value. When the calculated integrity value is not identical to the received integrity value, the decoding and error detection unit 1220 can determine that there is an error in the received data. However, this embodiment is a mere example for helping understanding of the present invention and does not limit the present invention. When there is an error in received data, the reception apparatus 1200 can re-receive the data in which the error has occurred from the transmission apparatus 1100, which will be further described below.

The switchover unit 1230 can be configured to switch at least one of the first connection between the transmission apparatus 1100 and the first receiver Rx21 and the second connection between the transmission apparatus 1100 and the second receiver Rx22. For example, the switchover unit 1230 can include a switching element or circuit. The switchover unit 1230 can switch at least one of the first connection and the second connection by closing or opening the switching element or circuit. However, the present invention is not limited to this example. As another example, the switchover unit 1230 can include another component, such as a transistor, a relay circuit, or a gate circuit, to switch at least one of the first connection and the second connection.

In an embodiment, as shown in FIG. 2, the switchover unit 1230 can be configured separately from other components included in the reception apparatus 1200. For example, the switchover unit 1230 can include a switchover circuit for switching at least one of the first connection and the second connection.

In another embodiment, unlike FIG. 2, the switchover unit 1230 can be included in another component. For example, the reception unit 1210 can include functions of the switchover unit 1230. In this example, functions of the switchover unit 1230 can be implemented by cutting off power supplied to at least one of the first receiver Rx21 and the second receiver Rx22 in the reception unit 1210. Alternatively, functions of the switchover unit 1230 can be implemented by providing a function termination command to at least one of the first receiver Rx21 and the second receiver Rx22. This is because the same operation as switching the first connection or the second connection can be performed when the power supplied to at least one of the first receiver Rx21 and the second receiver Rx22 is cut off or a function of at least one of the first receiver Rx21 and the second receiver Rx22 is interrupted.

When the decoding and error detection unit 1220 determines that there is an error in the received data, the switchover unit 1230 can switch at least one of the first connection and the second connection. As mentioned above, the reception apparatus 1200 cannot transmit data to the transmission apparatus 1100. Therefore, the reception apparatus 1200 cannot directly inform the transmission apparatus 1100 about the error in the received data. However, in an embodiment of the present invention, the reception apparatus 1200 can inform the transmission apparatus 1100 that there is an error in the received data by switching at least one of the first connection and the second connection with the switchover unit 1230.

The transmission apparatus 1100 can recognize that an error has occurred in the transmitted data by sensing switching of at least one of the first connection and the second connection, which will be further described below. Further, the transmission apparatus 1100 can re-transmit the data in which an error has occurred to the reception apparatus 1200. Accordingly, the reception unit 1210 of the reception apparatus 1200 can re-receive the data in which an error has occurred from the transmission apparatus 1100 via at least one of the first receiver Rx21 and the second receiver Rx22.

In an embodiment, when the decoding and error detection unit 1220 determines that there is an error in the received data, the decoding and error detection unit 1220 can directly control the switchover unit 1230 so that at least one of the first connection and the second connection is switched. In another embodiment, when the decoding and error detection unit 1220 determines that there is an error in the received data, the decoding and error detection unit 1220 can output a control signal. A separately provided controller or processor (not shown) can control the switchover unit 1230 in response to the control signal.

Operations of the reception apparatus 1200 using the switchover unit 1230 will be described in further detail with reference to FIG. 7. Embodiments relating to switching of the first connection and the second connection will be described with reference to FIGS. 8 to 13.

Data can be provided to the received data collection unit 1240 from the decoding and error detection unit 1220. In an embodiment of the present invention, when the decoding and error detection unit 1220 determines that there is no error in the received data, the decoding and error detection unit 1220 can provide the received data to the received data collection unit 1240. The received data collection unit 1240 can collect the provided data. The received data collection unit 1240 can transfer collected data to the received data collection system 1400. A configuration and operations of the received data collection unit 1240 will be described in further detail with reference to FIG. 3.

Figure 3:
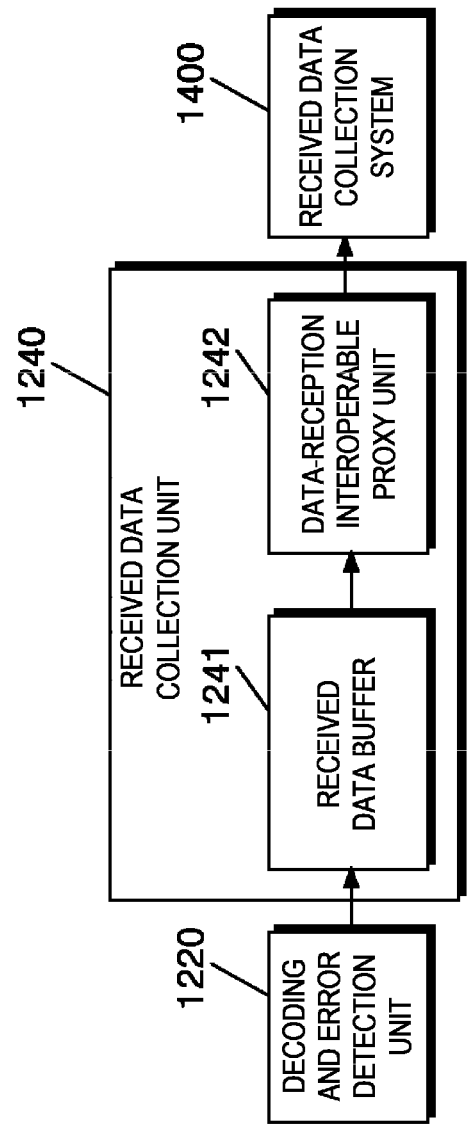
FIG. 3 is a block diagram of a received data collection unit included in the reception apparatus of FIG. 2.

FIG. 3 is a block diagram of a received data collection unit included in the reception apparatus of FIG. 2. Referring to FIG. 3, the received data collection unit 1240 can include a received data buffer 1241 and a data-reception interoperable proxy unit 1242.

Data can be provided to the received data buffer 1241 from the decoding and error detection unit 1220. As described above, when the decoding and error detection unit 1220 determines that there is no error in the received data, the decoding and error detection unit 1220 can provide the received data to the received data buffer 1241.

The received data buffer 1241 can temporarily store (i.e., buffer) the provided data. In some embodiments, the timing at which the data is output from the transmission apparatus 1100 (see FIG. 2) and the timing at which the data is provided to the received data collection unit 1240 may not be exactly the same. The received data buffer 1241 can buffer the data to synchronize the timing at which the data is output from the transmission apparatus 1100 and the timing at which the data is provided to the received data collection unit 1240. A time in which the received data buffer 1241 buffers the data can be adjusted to be suitable for the synchronization.

For example, the received data buffer 1241 can temporarily store the data in a database form. Alternatively, the received data buffer 1241 can temporarily store the data in the form of a file or a simple binary bit string. The implementation form of the received data buffer 1241 can be variously changed or modified as necessary.

The data can be provided to the data-reception interoperable proxy unit 1242 from the received data buffer 1241. The data-reception interoperable proxy unit 1242 can transfer the data provided from the received data buffer 1241 to at least one of the data collection systems 1410, 1420, and 1430 (see FIG. 1) in communication with the received data collection system 1400. The data-reception interoperable proxy unit 1242 can examine whether communication between each of the data collection systems 1410, 1420, and 1430 and the reception apparatus 1200 has been permitted. The data-reception interoperable proxy unit 1242 can transfer the data to a permitted data collection system.

Figure 4:
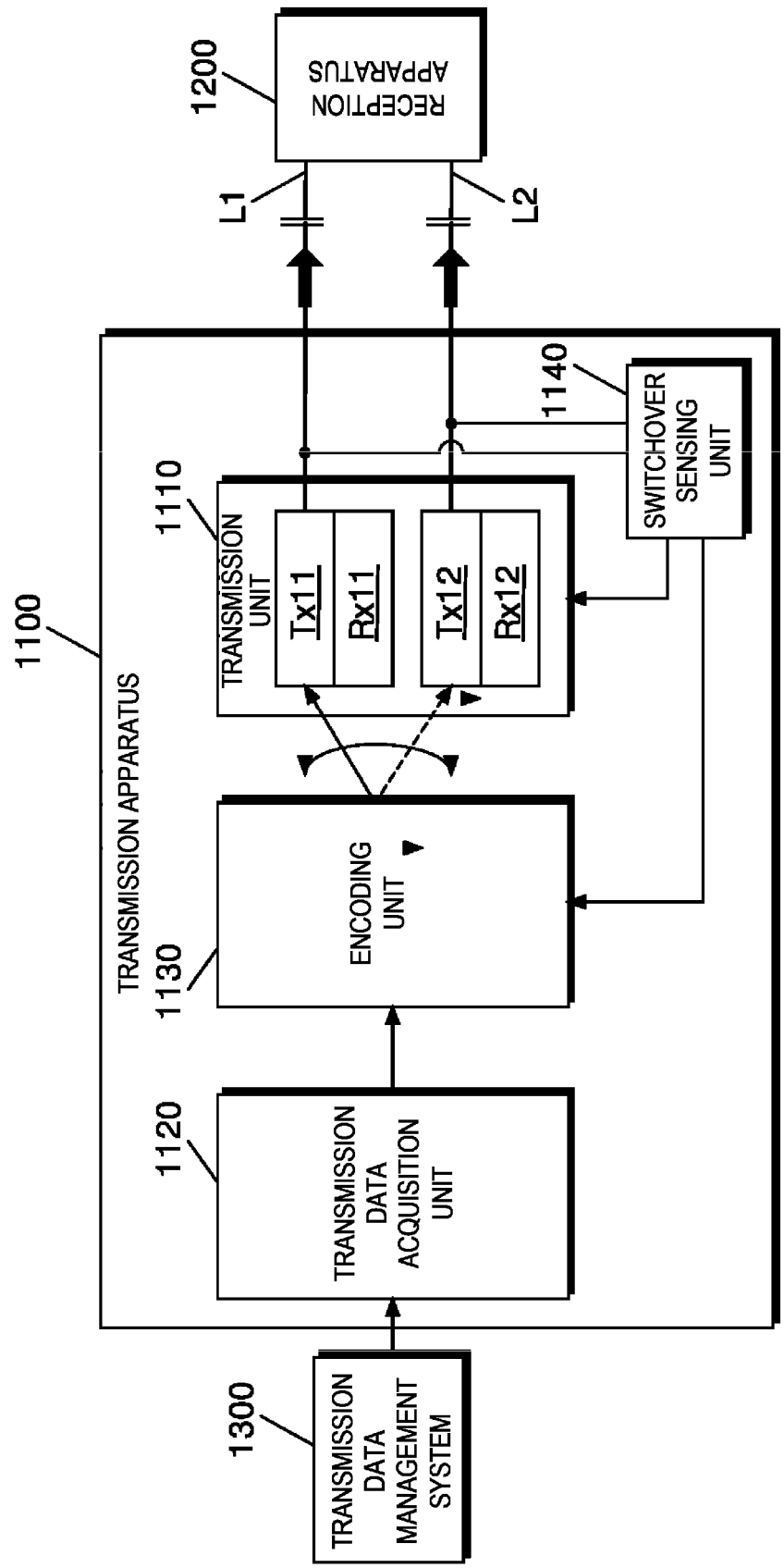
FIG. 4 is a block diagram of the transmission apparatus of FIG. 1.

FIG. 4 is a block diagram of the transmission apparatus of FIG. 1. Referring to FIG. 4, the transmission apparatus 1100 can include a transmission unit 1110, a transmission data acquisition unit 1120, an encoding unit 1130, and a switchover sensing unit 1140.

The transmission apparatus 1100 can transmit data in one direction to the reception apparatus 1200. The transmission apparatus 1100 can transmit data to the reception apparatus 1200 via at least one of the first communication line L1 and the second communication line L2. The transmission apparatus 1100 can acquire data to be transmitted to the reception apparatus 1200 from the transmission data management system 1300.

The transmission apparatus 1100 can include two transmitters Tx11 and Tx12. The first transmitter Tx11 can be connected to the first communication line L1. A first connection can be established between the first transmitter Tx11 and the reception apparatus 1200 via the first communication line L1. The first transmitter Tx11 can transmit data to the reception apparatus 1200 via the first communication line L1.

The second transmitter Tx12 can be connected to the second communication line L2. A second connection can be established between the second transmitter Tx12 and the reception apparatus 1200 via the first communication line L1. The second transmitter Tx12 can transmit data to the reception apparatus 1200 via the second communication line L2.

The transmission apparatus 1100 can include, for example, two receivers Rx11 and Rx12. However, the transmission apparatus 1100 does not receive data from the reception apparatus 1200. Therefore, the receivers Rx11 and Rx12 may not be connected to the communication lines L1 and L2 or may not operate. In some embodiments, the transmission unit 1110 may not include the receivers Rx11 and Rx12.

The transmission data acquisition unit 1120 can acquire data from the transmission data management system 1300. The data acquired by the transmission data acquisition unit 1120 can correspond to data to be transmitted to the reception apparatus 1200. A configuration and operations of the transmission data acquisition unit 1120 will be described in further detail with reference to FIG. 5.

The data can be provided to the encoding unit 1130 from the transmission data acquisition unit 1120. In some embodiments, the encoding unit 1130 can encode the provided data using an encoding technique. The encoding unit 1130 can provide the encoded data to at least one of the first transmitter Tx11 and the second transmitter Tx12. In this way, the transmission apparatus 1100 can transmit the data to the reception apparatus 1200 via at least one of the first transmitter Tx11 and the second transmitter Tx12.

In an embodiment, the encoding unit 1130 can generate an integrity value used by the reception apparatus 1200 for detecting an error in the data. As described above, an integrity value can include any value that is used for detecting an error in data, such as a hash value, a parity value, a value calculated according to a CRC algorithm, and so on. The encoding unit 1130 can encode the data to be transmitted together with the integrity value.

The switchover sensing unit 1140 can sense whether at least one of the first connection between the first transmitter Tx11 and the reception apparatus 1200 and the second connection between the second transmitter Tx12 and the reception apparatus 1200 has been switched. As described above, when there is an error in the data received by the reception apparatus 1200, the switchover unit 1230 (see FIG. 2) can switch at least one of the first connection and the second connection. When the switchover sensing unit 1140 senses that at least one of the first connection and the second connection has been switched, the transmission apparatus 1100 can recognize that there is an error in the data received by the reception apparatus 1200.

In an embodiment, as shown in FIG. 4, the switchover sensing unit 1140 can be configured separately from other components included in the transmission apparatus 1100. In this embodiment, the switchover sensing unit 1140 can include a sensing circuit. The sensing circuit can sense an electrical signal of at least one of the first communication line L1 and the second communication line L2. For example, the sensing circuit can sense whether the first communication line L1 and the second communication line L2 have been switched by measuring voltages of the first communication line L1 and the second communication line L2. Alternatively, the sensing circuit can sense whether the first communication line L1 and the second communication line L2 have been switched by measuring levels of current flowing through the first communication line L1 and the second communication line L2.

In another embodiment, unlike FIG. 4, the switchover sensing unit 1140 can be included in another component. For example, the transmission apparatus 1100 can include functions of the switchover sensing unit 1140. In this example, functions of the switchover sensing unit 1140 can be implemented by providing functions of recognizing connection states of the first connection and the second connection respectively to the first transmitter Tx11 and the second transmitter Tx12 in the transmission unit 1110. For example, the switchover sensing unit 1140 can be implemented by a connection sensing function of a network communication apparatus.

When the switchover sensing unit 1140 senses that at least one of the first connection and the second connection has been switched (i.e., the transmission apparatus 1100 recognizes that there is an error in the data received by the reception apparatus 1200), the transmission unit 1110 and the encoding unit 1130 can perform operations for re-transmitting the data in which the error has occurred at the reception apparatus 1200 to the reception apparatus 1200. For example, the encoding unit 1130 can encode second data including first data in which the error has occurred at the reception apparatus 1200 together with an integrity value. The transmission unit 1110 can transmit the encoded data to the reception apparatus 1200 via at least one of the first transmitter Tx11 and the second transmitter Tx12.

To help understanding of the present invention, an exemplary embodiment will be described. The transmission data acquisition unit 1120 can acquire preceding data which will be first transmitted to the reception apparatus 1200. The encoding unit 1130 can encode the preceding data together with an integrity value for the preceding data. The transmission unit 1110 can transmit the encoded preceding data to the reception apparatus 1200 via at least one of the first transmitter Tx11 and the second transmitter Tx12.

After or during the transmission, the transmission data acquisition unit 1120 can further acquire following data which will be transmitted to the reception apparatus 1200 subsequent to the preceding data. Further, the switchover sensing unit 1140 can sense whether at least one of the first connection and the second connection has been switched.

For example, when an error occurs in the data received by the reception apparatus 1200, the switchover sensing unit 1140 can detect that at least one of the first connection and the second connection has been switched. In this case, the encoding unit 1130 can generate combined data by combining the preceding data and the following data. The encoding unit 1130 can encode the combined data together with an integrity value for the combined data. The transmission unit 1110 can transmit the encoded combined data to the reception apparatus 1200 via at least one of the first transmitter Tx11 and the second transmitter Tx12. The reception apparatus 1200 can receive the combined data. In this way, the reception apparatus 1200 can re-receive the preceding data (i.e., the data in which the error has occurred) included in the combined data.

In some embodiments, following data can be separate from preceding data. In other words, in these embodiments, the transmission apparatus 1100 can re-transmit the preceding data by including the preceding data in other data (e.g., the following data). In some other embodiments, following data can be identical to preceding data. In other words, in these embodiments, the preceding data is not included in other data, and the transmission apparatus 1100 can re-transmit only the preceding data.

According to an embodiment of the present invention, in one-way data communication, the occurrence of a data error can be easily recognized using switching of the connection of a communication line. Further, data in which an error has occurred is re-transmitted, so that the reliability of one-way data communication can be improved. In particular, according to an embodiment of the present invention, the reception apparatus 1200 does not transmit data to the transmission apparatus 1100, and therefore, characteristics of one-way data communication do not deteriorate.

For example, when no error occurs in the data received by the reception apparatus 1200, the switchover sensing unit 1140 cannot sense switching of the first connection and the second connection. In this case, it is unnecessary to re-transmit the preceding data. Therefore, the encoding unit 1130 can encode only the following data together with an integrity value for the following data. The transmission unit 1110 can transmit the encoded following data to the reception apparatus 1200 via at least one of the first transmitter Tx11 and the second transmitter Tx12.

In an embodiment, when the switchover sensing unit 1140 senses that at least one of the first connection and the second connection has been switched, the switchover sensing unit 1140 can directly control the transmission unit 1110 and the encoding unit 1130, so that data is re-transmitted. In another embodiment, when the switchover sensing unit 1140 senses that at least one of the first connection and the second connection has been switched, the switchover sensing unit 1140 can output a control signal. The separately provided controller or processor (not shown) can control the transmission unit 1110 and the encoding unit 1130 in response to the control signal.

Operations of the transmission apparatus 1100 using the switchover sensing unit 1140 will be described in further detail with reference to FIG. 6. Embodiments relating to data transmission via at least one of the first communication line L1 and the second communication line L2 will be descried with reference to FIGS. 8 to 13.

Figure 5:
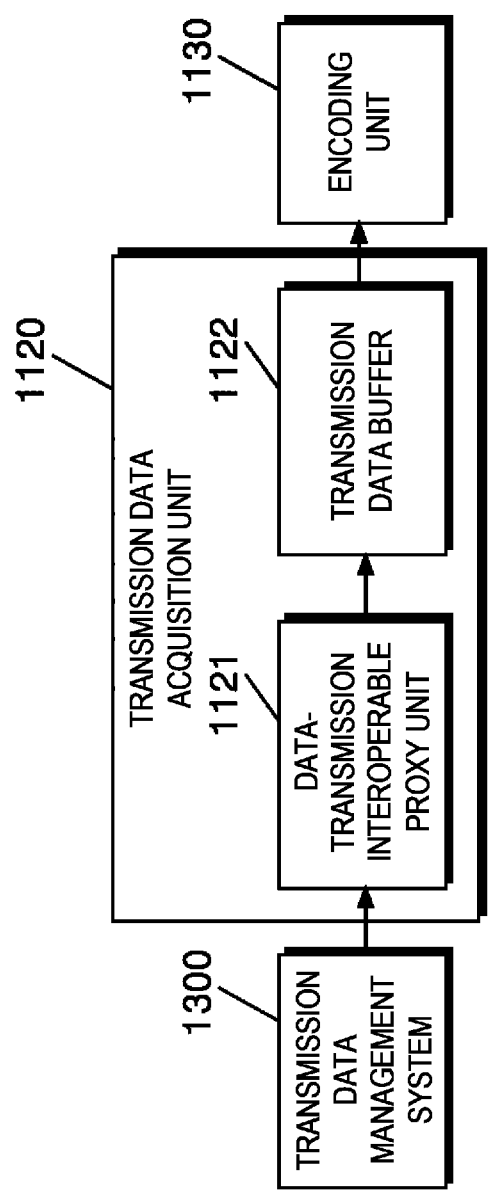
FIG. 5 is a block diagram of a transmission data acquisition unit included in the transmission apparatus of FIG. 4.

FIG. 5 is a block diagram of a transmission data acquisition unit included in the transmission apparatus of FIG. 4. Referring to FIG. 5, the transmission data acquisition unit 1120 can include a data-transmission interoperable proxy unit 1121 and a transmission data buffer 1122.

The data-transmission interoperable proxy unit 1121 can acquire data from at least one of the data transmission systems 1310, 1320, and 1330 in communication with the transmission data management system 1300. The data-transmission interoperable proxy unit 1121 can examine whether communication between each of the data transmission systems 1310, 1320, and 1330 and the transmission apparatus 1100 (see FIG. 4) has been permitted. The data-transmission interoperable proxy unit 1121 can acquire data from a permitted data transmission system. The data acquired by the data-transmission interoperable proxy unit 1121 can correspond to data to be transmitted to the reception apparatus 1200 (see FIG. 4).

The data can be provided to the transmission data buffer 1122 from the data-transmission interoperable proxy unit 1121. The transmission data buffer 1122 can temporarily store (i.e., buffer) the provided data. The transmission data buffer 1122 can provide the stored data to the encoding unit 1130.

In some embodiments, the timing at which the data is output from the transmission apparatus 1100 and the timing at which the reception apparatus 1200 receives the data may not be exactly the same. The transmission data buffer 1122 can buffer the data to synchronize the timing at which the data is output from the transmission apparatus 1100 and the timing at which the reception apparatus 1200 receives the data. A time in which the transmission data buffer 1122 buffers the data can be adjusted to be suitable for the synchronization.

As described above, when an error occurs in data received by the reception apparatus 1200, the transmission apparatus 1100 combines preceding data and following data and then encodes the combined data together with an integrity value. To prepare for a case in which the preceding data is re-transmitted to the reception apparatus 1200, the transmission data buffer 1122 can temporarily store the preceding data for an appropriate time. When it is necessary to re-transmit the preceding data to the reception apparatus 1200, the encoding unit 1130 can receive the preceding data stored in the transmission data buffer 1122 and combine the preceding data with the following data.

For example, the transmission data buffer 1122 can temporarily store the data in a database form. Alternatively, the transmission data buffer 1122 can temporarily store the data in the form of a file or a simple binary bit string. The implementation form of the transmission data buffer 1122 can be variously changed or modified as necessary.

Figure 6:
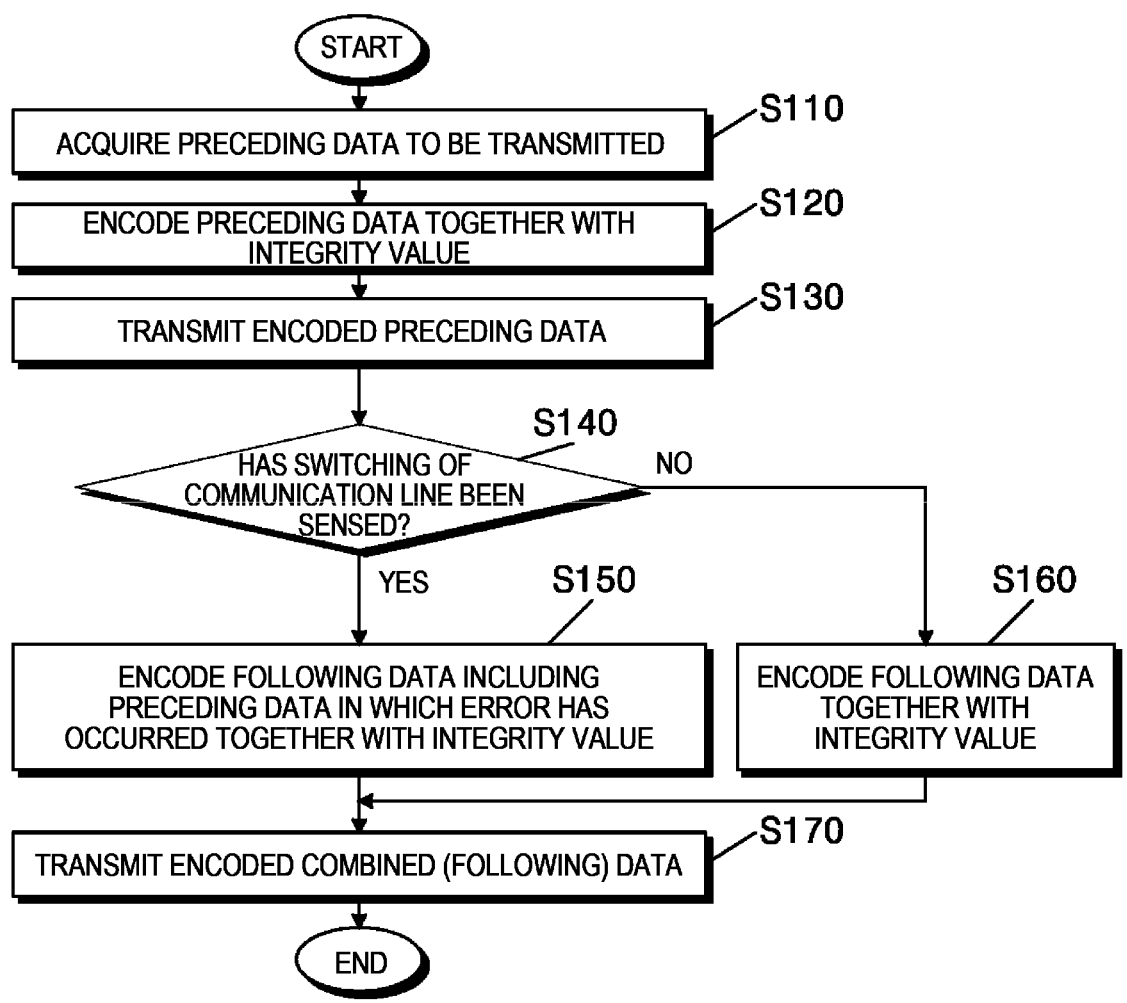
FIG. 6 is a flowchart illustrating a method of transmitting data using a transmission apparatus according to an embodiment of the present invention.

FIG. 6 is a flowchart illustrating a method of transmitting data using a transmission apparatus according to an embodiment of the present invention. For example, the method of FIG. 6 can be performed to transmit data in one direction to the reception apparatus 1200 of FIG. 2 using the transmission apparatus 1100 of FIG. 4. To help understanding of the present invention, description will be made with reference to FIGS. 1 to 5 as well.

In operation S110, the transmission apparatus 1100 can acquire first data (e.g., preceding data which will be transmitted first) which will be transmitted to the reception apparatus 1200. For example, the transmission apparatus 1100 can acquire the first data from at least one of the data transmission systems 1310, 1320, and 1330 using the data-transmission interoperable proxy unit 1121 of the transmission data acquisition unit 1120. The acquired first data can be stored in the transmission data buffer 1122.

In operation S120, the transmission apparatus 1100 can encode the first data. For example, the encoding unit 1130 can read data stored in the transmission data buffer 1122 to encode the first data. In an embodiment, the transmission apparatus 1100 can generate a first integrity value used by the reception apparatus 1200 for detecting an error in the first data. The transmission apparatus 1100 can encode the first data together with the first integrity value using the encoding unit 1130.

In operation S130, the transmission apparatus 1100 can transmit the encoded first data to the reception apparatus 1200. For example, the transmission apparatus 1100 can transmit the encoded first data to the reception apparatus 1200 using at least one of the first transmitter Tx11 and the second transmitter Tx12 in the transmission unit 1110. The encoded first data can be transmitted using at least one of the first communication line L1 and the second communication line L2. After or during the transmission, the transmission apparatus 1100 can further acquire third data which will be transmitted to the reception apparatus 1200 (e.g., following data which will be transmitted subsequent to the preceding data).

In operation S140, the transmission apparatus 1100 can sense whether at least one of the first communication line L1 and the second communication line L2 has been switched. As mentioned above, the reception apparatus 1200 cannot transmit data to the transmission apparatus 1100. Therefore, in an embodiment of the present invention, the reception apparatus 1200 can switch at least one of the first communication line L1 and the second communication line L2 to inform the transmission apparatus 1100 about an error in the received first data. For example, the transmission apparatus 1100 can recognize that an error has occurred in the transmitted first data by sensing switching of at least one of the first communication line L1 and the second communication line L2 through the switchover sensing unit 1140.

When it is sensed that at least one of the first communication line L1 and the second communication line L2 has been switched, operation S150 can be performed. On the other hand, when it is sensed that neither of the first communication line L1 and the second communication line L2 has been switched, operation S160 can be performed.

In operation S150, the transmission apparatus 1100 can encode second data (e.g., combined data including the preceding data and the following data) including the first data (e.g., the preceding data). For example, the encoding unit 1130 can read data (particularly, the first data in which an error has occurred) stored in the transmission data buffer 1122 to encode the second data. In an embodiment, the transmission apparatus 1100 can generate a second integrity value used by the reception apparatus 1200 for detecting an error in the second data. For example, the transmission apparatus 1100 can encode the second data together with the second integrity value using the encoding unit 1130. Further, in operation S170, the transmission apparatus 1100 can transmit the encoded second data to the reception apparatus 1200 using at least one of the first transmitter Tx11 and the second transmitter Tx12.

In operations S150 and S170, the transmission apparatus 1100 can include the first data, in which an error has occurred, in the second data, encode the second data, and transmit the encoded second data to the reception apparatus 1200. In this way, when an error occurs in the first data received by the reception apparatus 1200, the transmission apparatus 1100 can re-transmit the first data to the reception apparatus 1200. Therefore, the reliability of one-way data communication can be improved.

In operation S160, the transmission apparatus 1100 encodes the third data (e.g., the following data). When no error of the first data has occurred at the reception apparatus 1200, it is unnecessary to re-transmit the first data. Therefore, the transmission apparatus 1100 can encode only the third data without the first data. In an embodiment, the transmission apparatus 1100 can generate a third integrity value used by the reception apparatus 1200 for detecting an error in the third data. For example, the transmission apparatus 1100 can encode the third data together with the third integrity value using the encoding unit 1130. Further, in operation S170, the transmission apparatus 1100 can transmit the encoded third data to the reception apparatus 1200 via at least one of the first transmitter Tx11 and the second transmitter Tx12.

Figure 7:
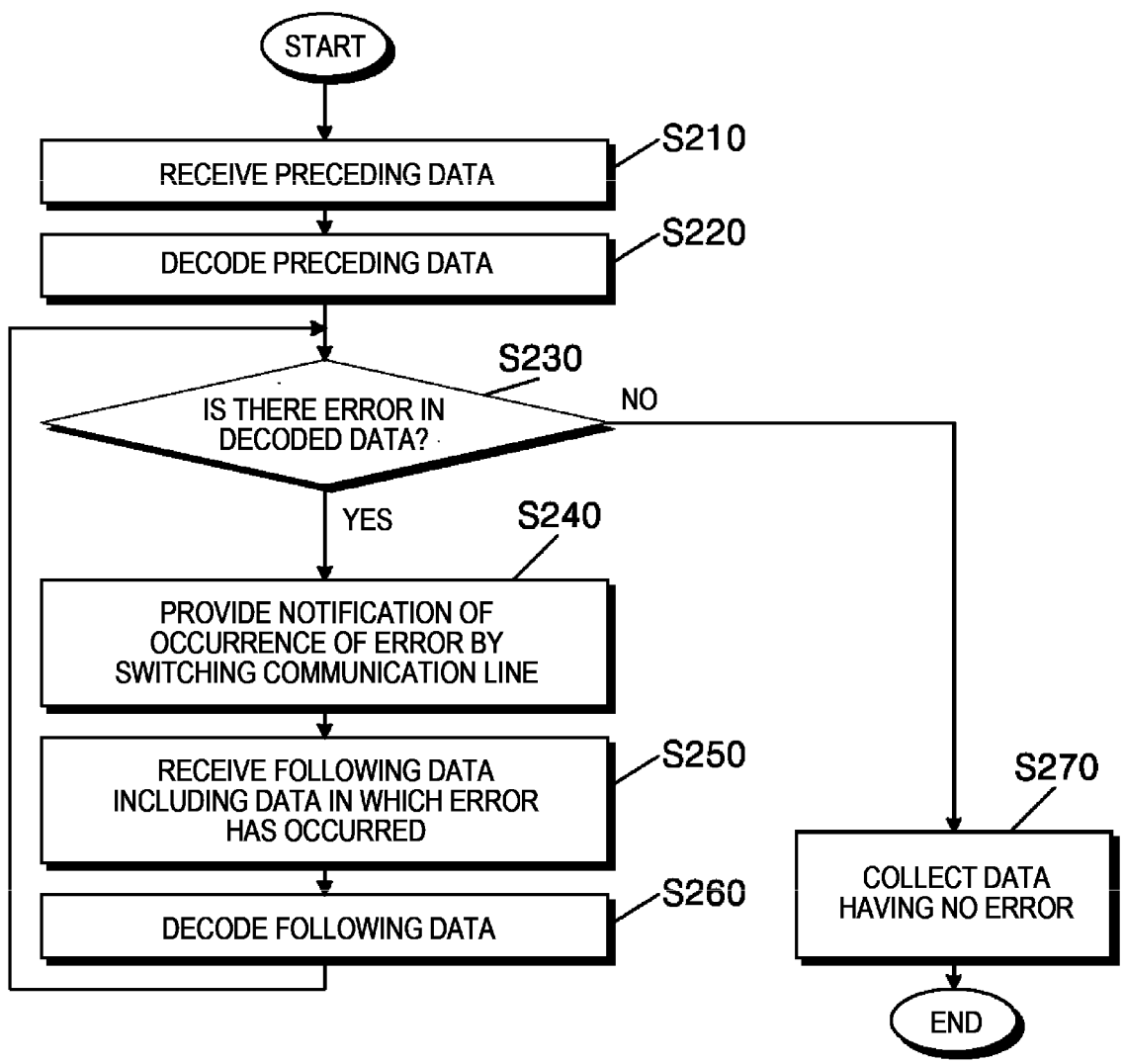
FIG. 7 is a flowchart illustrating a method of receiving data using a reception apparatus according to an embodiment of the present invention.

FIG. 7 is a flowchart illustrating a method of receiving data using a reception apparatus according to an embodiment of the present invention. For example, the method of FIG. 7 can be performed to receive data in one direction from the transmission apparatus 1100 of FIG. 4 using the reception apparatus 1200 of FIG. 2. To help understanding of the present invention, description will be made with reference to FIGS. 1 to 3 as well.

In operation S210, the reception apparatus 1200 can receive second data including first data (e.g., preceding data) from the transmission apparatus 1100. In an embodiment, the second data can include the first data and an integrity value used for detecting an error in the first data. For example, the reception apparatus 1200 can receive the second data using at least one of the first receiver Rx21 and the second receiver Rx22 in the reception unit 1210. The first receiver Rx21 and the second receiver Rx22 can receive data transmitted via the first communication line L1 and the second communication line L2, respectively.

In operation S220, the reception apparatus 1200 can decode the received second data. For example, the reception apparatus 1200 can decode the second data using the decoding and error detection unit 1220. In this way, the reception apparatus 1200 can acquire the first data included in the second data and the integrity value corresponding to the first data.

In operation S230, the reception apparatus 1200 can examine whether there is an error in the decoded second data. More specifically, the reception apparatus 1200 can examine whether there is an error in the first data with reference to the integrity value included in the decoded second data. For example, the reception apparatus 1200 can detect an error in the first data using the decoding and error detection unit 1220.

When it is determined that there is an error in the first data, operation S240 can be performed. On the other hand, when it is determined that there is no error in the first data, operation S270 can be performed.

In operation S240, the reception apparatus 1200 can switch at least one of the first communication line L1 and the second communication line L2. For example, the reception apparatus 1200 can switch at least one of the first communication line L1 and the second communication line L2 using the switchover unit 1230.

As mentioned above, the reception apparatus 1200 cannot transmit data to the transmission apparatus 1100. Therefore, in an embodiment of the present invention, the reception apparatus 1200 can switch at least one of the first communication line L1 and the second communication line L2 to inform the transmission apparatus 1100 about an error in the received first data. According to an embodiment of the present invention, in one-way data communication, the occurrence of a data error can be easily indicated using switching of the connection of a communication line. When the transmission apparatus 1100 senses switching of at least one of the first communication line L1 and the second communication line L2, the connection of the switched line can be restored at an appropriate point in time.

In operation S250, the reception apparatus 1200 can receive third data (e.g., encoded combined data including the preceding data and following data) including the first data in which an error has occurred from the transmission apparatus 1100. Further, in operation S260, the reception apparatus 1200 can decode the third data. By decoding the third data, the reception apparatus 1200 can acquire the first data included in the decoded third data and the integrity value corresponding to the first data. The reception apparatus 1200 can examine whether there is an error in the decoded data using the decoding and error detection unit 1220.

In operations S240 and S260, the reception apparatus 1200 can inform the transmission apparatus 1100 about the data error and re-receive the data in which the error has occurred. Therefore, the reliability of one-way data communication can be improved.

In operation S270, the reception apparatus 1200 can collect the data having no error. For example, the reception apparatus 1200 can store the collected data in the received data buffer 1241 of the received data collection unit 1240. The data stored in the received data buffer 1241 can be transferred to at least one of the data collection systems 1410, 1420, and 1430 via the data-reception interoperable proxy unit 1242.

Figure 8:
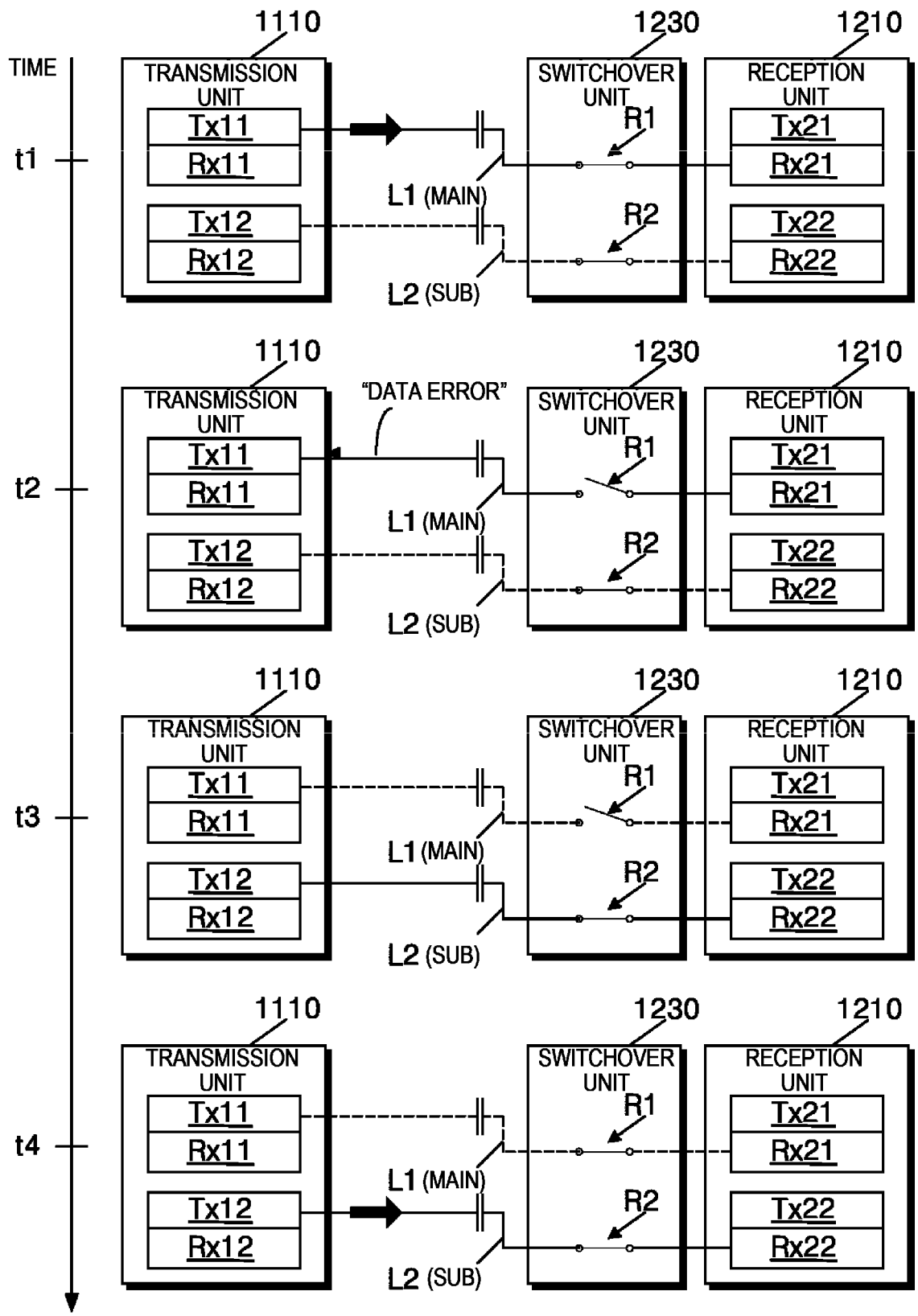
FIG. 8 is a conceptual diagram illustrating a process of re-transmitting data according to an embodiment of the present invention.
Figure 9:
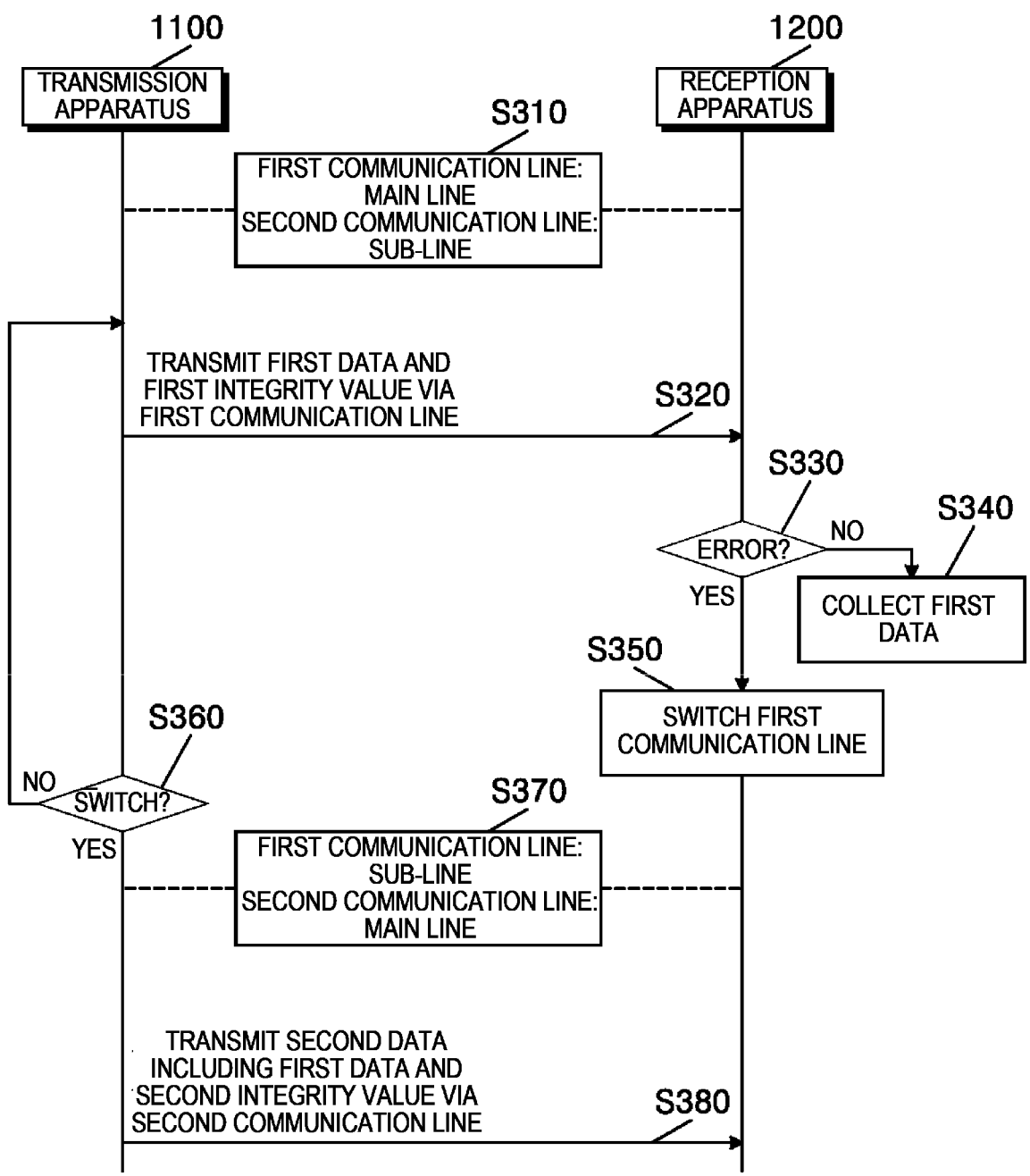
FIG. 9 is a flowchart illustrating the process of re-transmitting data according to the embodiment of the present invention.

FIG. 8 is a conceptual diagram illustrating a process of re-transmitting data according to an embodiment of the present invention. FIG. 9 is a flowchart illustrating the process of re-transmitting data according to the embodiment of the present invention. To help understanding of the present invention, description will be made with reference to FIGS. 8 and 9 together.

As described above, the transmission apparatus 1100 and the reception apparatus 1200 can be connected via, for example, the first communication line L1 and the second communication line L2. In an embodiment, the first communication line L1 can be set as a main communication line (S310). On the other hand, the second communication line L2 can be set as a sub-communication line (S310). In this embodiment, one-way data communication can be performed via the main communication line. However, this embodiment is not for limiting the present invention and is a mere example for helping understanding of the present invention.

According to the above settings, at a time t1, the transmission apparatus 1100 can transmit first data to the first receiver Rx21 of the reception unit 1210 via the first communication line L1, which is the main communication line, using the first transmitter Tx11 of the transmission unit 1110 (S320). For example, the transmission apparatus 1100 can transmit a first integrity value used by the reception apparatus 1200 for detecting an error in the first data to the reception apparatus 1200 together with the first data. To this end, at the time t1, the switchover unit 1230 can maintain a first connection R1 of the first communication line L1.

Subsequently, the reception apparatus 1200 can examine whether there is an error in the first data with reference to the first integrity value (S330). When it is determined that there is no error in the first data, the reception apparatus 1200 can collect the first data (S340). On the other hand, when it is determined that there is an error in the first data, the reception apparatus 1200 can switch the first communication line L1 which is the main communication line (S350). To this end, at a time t2, the switchover unit 1230 can cut off the first connection R1 of the first communication line L1.

When the first communication line L1 has not been switched, the transmission apparatus 1100 can continuously transmit next data to the reception apparatus 1200 via the first communication line L1. On the other hand, when the transmission apparatus 1100 senses switching of the first communication line L1 (S360), at a time t3, the second communication line L2 can be set as the main communication line, and the first communication line L1 can be set as the sub-communication line (S370). In other words, roles of the first communication line L1 and the second communication line L2 can be exchanged.

The transmission apparatus 1100 can recognize that an error of the first data has occurred at the reception apparatus 1200 by sensing switching of the first communication line L1. Therefore, at a time t4, the transmission apparatus 1100 can transmit second data to the reception apparatus 1200 via the second communication line L2 which is the main communication line using the second transmitter Tx12 of the transmission unit 1110 (S380). To this end, the switchover unit 1230 can maintain a second connection R2 of the second communication line L2. The reception apparatus 1200 can receive the second data via the second receiver Rx22 of the reception unit 1210. After the transmission apparatus 1100 senses switching of the first communication line L1, the first connection R1 of the first communication line L1 can be restored at an appropriate point in time.

Here, the second data can include the first data in which the error has occurred at the reception apparatus 1200. Further, the transmission apparatus 1100 can transmit a second integrity value used by the reception apparatus 1200 for detecting an error in the second data together with the second data. In this way, the transmission apparatus 1100 can re-transmit the first data in which the error has occurred at the reception apparatus 1200, and the reception apparatus 1200 can re-receive the first data.

In the embodiment of FIGS. 8 and 9, a data error can be indicated by switching the main communication line. However, after the main communication line is switched, it may take time to restore the connection of the main communication line. Therefore, in the embodiment of FIGS. 8 and 9, data can be re-transmitted via a non-switched communication line by exchanging roles of the communication lines. According to the embodiment of FIGS. 8 and 9, a time for re-transmitting data is reduced, and data in which an error has occurred can be rapidly re-transmitted. Further, since data can be re-transmitted in real time, an error can be rapidly corrected.

Figure 10:
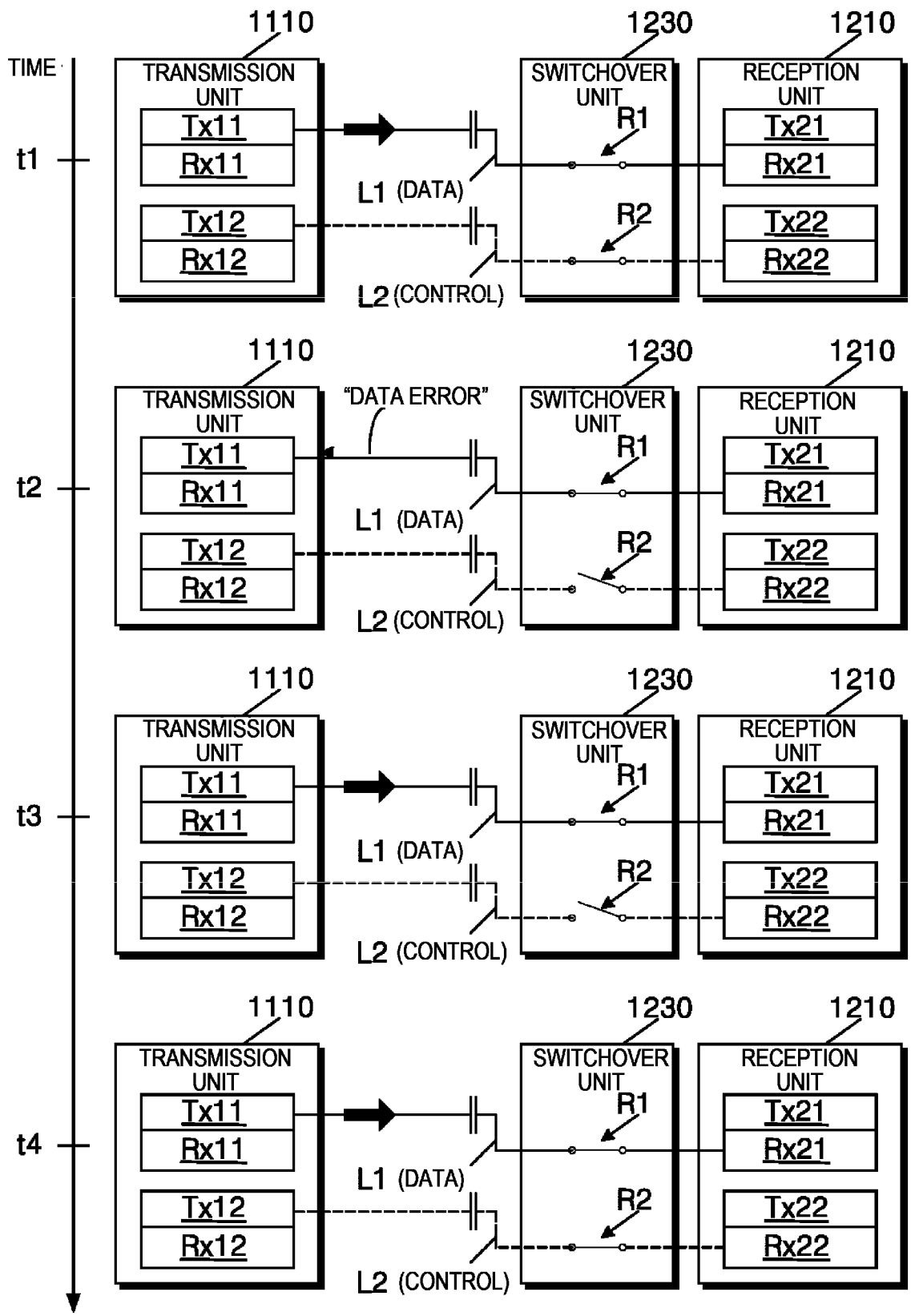
FIG. 10 is a conceptual diagram illustrating a process of re-transmitting data according to another embodiment of the present invention.
Figure 11:
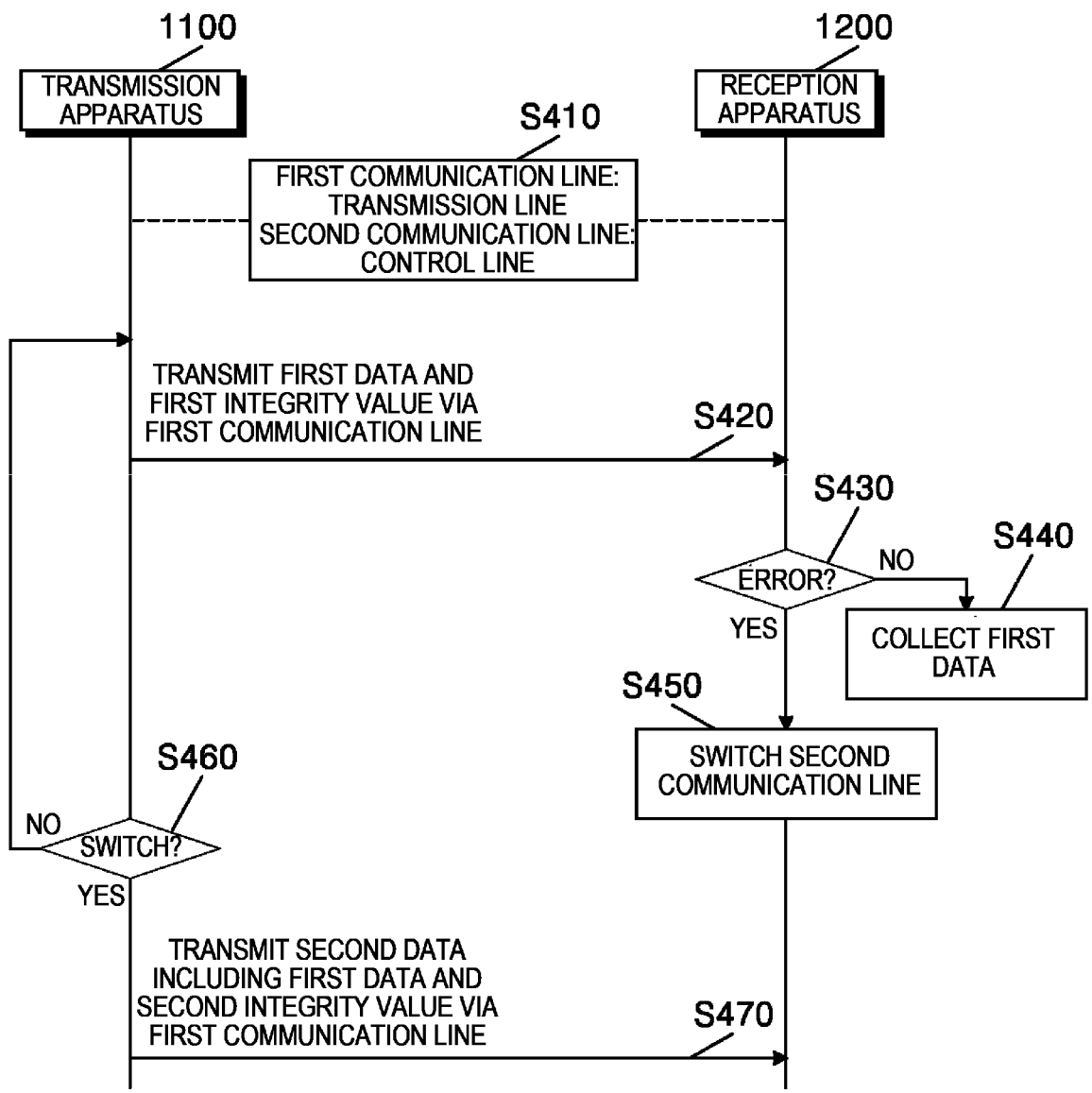
FIG. 11 is a flowchart illustrating the process of re-transmitting data according to the other embodiment of the present invention.

FIG. 10 is a conceptual diagram illustrating a process of re-transmitting data according to another embodiment of the present invention. FIG. 11 is a flowchart illustrating the process of re-transmitting data according to the other embodiment of the present invention. To help understanding of the present invention, description will be made with reference to FIGS. 10 and 11 together.

As described above, the transmission apparatus 1100 and the reception apparatus 1200 can be connected via, for example, the first communication line L1 and the second communication line L2. In an embodiment, the first communication line L1 can be set as a transmission line (S410). On the other hand, the second communication line L2 can be set as a control line (S410). In this embodiment, the transmission line can be used to for transmitting data, and the control line can be used for performing a switching operation for providing a notification of a data error. However, this embodiment is not for limiting the present invention and is a mere example for helping understanding of the present invention.

According to the above settings, at a time t1, the transmission apparatus 1100 can transmit first data to the first receiver Rx21 of the reception unit 1210 via the first communication line L1, which is the transmission communication line, using the first transmitter Tx11 of the transmission unit 1110 (S420). For example, the transmission apparatus 1100 can transmit a first integrity value used by the reception apparatus 1200 for detecting an error in the first data to the reception apparatus 1200 together with the first data. To this end, at the time t1, the switchover unit 1230 can maintain a first connection R1 of the first communication line L1.

Subsequently, the reception apparatus 1200 can examine whether there is an error in the first data with reference to the first integrity value (S430). When it is determined that there is no error in the first data, the reception apparatus 1200 can collect the first data (S440). On the other hand, when it is determined that there is an error in the first data, the reception apparatus 1200 can switch the second communication line L2 which is the control line (S450). To this end, at a time t2, the switchover unit 1230 can cut off a second connection R2 of the second communication line L2.

When the second communication line L2 has not been switched, the transmission apparatus 1100 can continuously transmit next data to the reception apparatus 1200 via the first communication line L1. On the other hand, when the transmission apparatus 1100 senses switching of the second communication line L2 (S460), the transmission apparatus 1100 can recognize that an error of the first data has occurred at the reception apparatus 1200. Therefore, at a time t3, the transmission apparatus 1100 can transmit second data to the reception apparatus 1200 via the first communication line L1 which is the transmission line using the first transmitter Tx11 (S470). After the transmission apparatus 1100 senses switching of the second communication line L2, the second connection R2 of the second communication line L2 can be restored at an appropriate point in time (e.g., at a time t4).

Here, the second data can include the first data in which the error has occurred at the reception apparatus 1200. Further, the transmission apparatus 1100 can transmit a second integrity value used by the reception apparatus 1200 for detecting an error in the second data together with the second data. In this way, the transmission apparatus 1100 can re-transmit the first data in which the error has occurred at the reception apparatus 1200, and the reception apparatus 1200 can re-receive the first data.

In the embodiment of FIGS. 10 and 11, a data error can be indicated by switching the control line. Further, data can be re-transmitted via the transmission line for which connection is continuously maintained. According to the embodiment of FIGS. 10 and 11, since the transmission line is not switched, data re-transmission can be continuous, and a time for re-transmitting data can be reduced. Further, since the transmission line and the control line are separated from each other, it is possible to improve convenience in implementing the transmission apparatus 1100 and the reception apparatus 1200.

Figure 12:
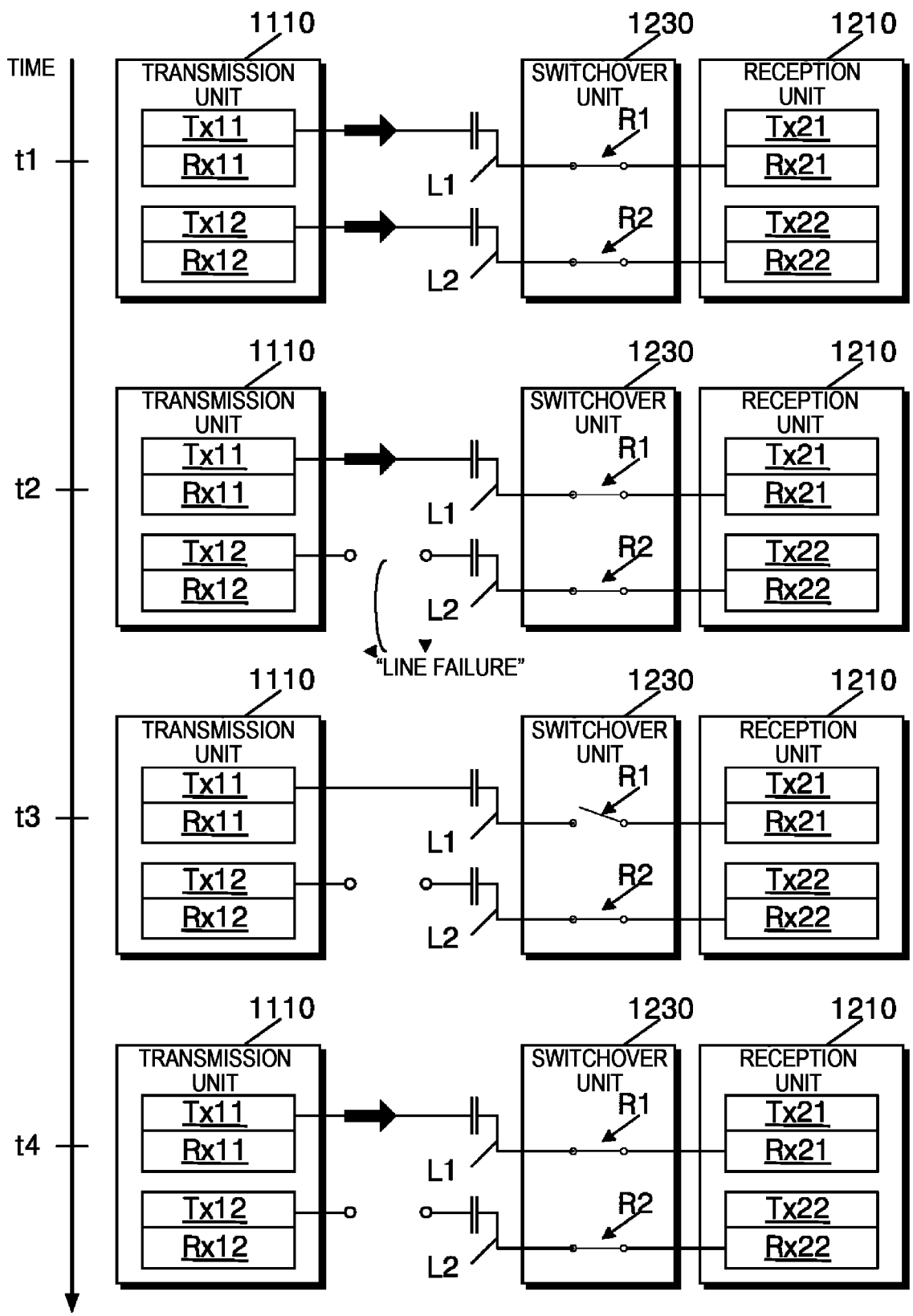
FIG. 12 is a conceptual diagram illustrating a process of re-transmitting data according to still another embodiment of the present invention.
Figure 13:
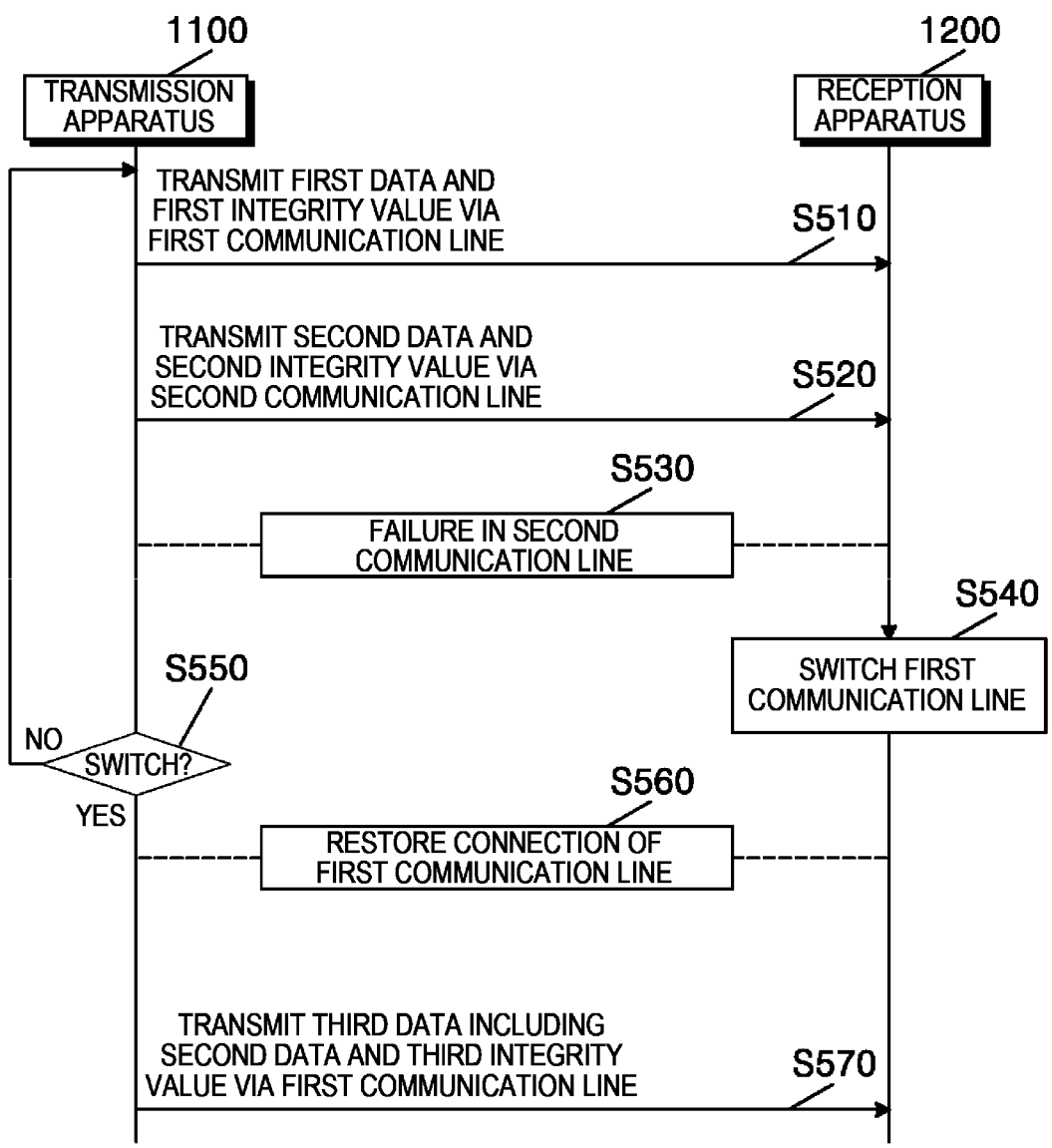
FIG. 13 is a flowchart illustrating the process of re-transmitting data according to still another embodiment of the present invention.

FIG. 12 is a conceptual diagram illustrating a process of re-transmitting data according to still another embodiment of the present invention. FIG. 13 is a flowchart illustrating the process of re-transmitting data according to still another embodiment of the present invention. To help understanding of the present invention, description will be made with reference to FIGS. 12 and 13 together.

As described above, the transmission apparatus 1100 and the reception apparatus 1200 can be connected via, for example, the first communication line L1 and the second communication line L2. In an embodiment, the first communication line L1 and the second communication line L2 can be used for transmitting data simultaneously or in parallel. However, this embodiment does not limit the present invention and is a mere example for helping understanding of the present invention.

According to the above settings, at a time t1, the transmission apparatus 1100 can transmit first data to the first receiver Rx21 of the reception unit 1210 via the first communication line L1 using the first transmitter Tx11 of the transmission unit 1110 (S510). Also, the transmission apparatus 1100 can transmit second data to the second receiver Rx22 of the reception unit 1210 via the second communication line L2 using the second transmitter Tx12 of the transmission unit 1110 (S520). For example, the transmission apparatus 1100 can transmit a first integrity value used by the reception apparatus 1200 for detecting an error in the first data to the reception apparatus 1200 together with the first data. Further, the transmission apparatus 1100 can transmit a second integrity value used by the reception apparatus 1200 for detecting an error in the second data to the reception apparatus 1200 together with the second data. To this end, at the time t1, the switchover unit 1230 can maintain a first connection R1 of the first communication line L1 and a second connection R2 of the second communication line L2.

For example, at a time t2, a failure (e.g., a disconnection, etc.) may occur in the second communication line L2 (S530). In this example, the reception apparatus 1200 can switch the first communication line L1 at a time t3 to inform the transmission apparatus 1100 about the failure in the second communication line L2 (S540). To this end, at the time t3, the switchover unit 1230 can cut off the first connection R1 of the first communication line L1.

When the first communication line L1 has not been switched, the transmission apparatus 1100 can continuously transmit next data to the reception apparatus 1200 via the first communication line L1 and the second communication line L2. On the other hand, when the transmission apparatus 1100 senses switching of the first communication line L1 (S550), the transmission apparatus 1100 can recognize that an error has occurred in the second communication line L2. After the transmission apparatus 1100 senses switching of the first communication line L1, the first connection R1 of the first communication line L1 can be restored at a time t4 (S560).

However, since a failure has occurred in the second communication line L2, there is a high probability that the second data and the second integrity value will not be appropriately transmitted to the reception apparatus 1200. Therefore, after the first connection R1 of the first communication line L1 is restored, the transmission apparatus 1100 can re-transmit the second data that it has attempted to transmit to the reception apparatus 1200 via the second communication line L2 to the reception apparatus 1200.

For example, the transmission apparatus 1100 can transmit third data including the second data to the reception apparatus 1200 via the restored first communication line L1. Further, the transmission apparatus 1100 can transmit a third integrity value used by the reception apparatus 1200 for detecting an error in the third data together with the third data. In this way, the reception apparatus 1200 can re-receive the second data included in the third data.

In the embodiment of FIGS. 12 and 13, a communication line in which a failure has occurred can be indicated by switching a communication line in which no failure has occurred. Further, data can be re-transmitted via a communication line which has been switched and then restored. According to the embodiment of FIGS. 12 and 13, the occurrence of a failure in a communication line can be easily recognized. Further, data in which an error has occurred is re-transmitted, so that the reliability of one-way data communication can be improved.

The configuration shown in the conceptual diagrams should be understood in a conceptual sense only. To help understanding of the present invention, the shapes, structures, sizes, etc. of the components shown in the conceptual diagrams are exaggerated or reduced. Components that are actually implemented can have different physical shapes from the shapes shown in the conceptual diagrams. The conceptual diagrams do not limit the physical shapes of the components.

The configurations of the apparatuses shown in the block diagrams are for helping understanding of the present invention. Each block can be formed of smaller blocks according to a function. Alternatively, a plurality of blocks can form a larger block according to a function. In other words, the technical spirit of the present invention is not limited by the configurations shown in the block diagrams.

Thus far, the present invention has been described mainly with embodiments. However, in view of the characteristics of the technical field, the object of the present invention can be achieved in a different form from the above embodiments while including the subject matter of the present invention. Accordingly, the above embodiments should be understood not in a limitative view but in an illustrative view. That is, technical spirits which include the subject matter of the present invention and can achieve the same objects as the present invention should be understood to be included in the present invention.

Therefore, technical spirits variously changed and modified without departing from the spirit of the present invention are included in the claimed scope. Also, the protective scope of the present invention should not be construed to be limited to the above embodiments.

INDUSTRIAL APPLICABILITY

The present invention relates to a transmission apparatus and a reception apparatus used in a one-way data communication system, and can provide a transmission apparatus and a reception apparatus that transmit data in one direction and operate to recognize an error in the data in response to switching of a communication line.

The invention claimed is:

1. A reception apparatus configured to receive data in one direction from a transmission apparatus, the reception apparatus comprising: a first wired communication line; a second wired communication line; a reception unit including a first receiver connected to the first wired communication line and a second receiver connected to the second wired communication line which is separate from the first wired communication one; an error detection unit configured to examine whether there is an error in target data received from the transmission apparatus via the first receiver, output a control signal when there is an error in the target data; and a switchover unit, wherein the switchover unit includes a first switch connected between the first receiver and the first wired communication line, and a second switch connected between the second receiver and the second wired communication line, wherein the data is only unidirectionally transmitted from the transmission apparatus to the reception apparatus, wherein the switchover unit receives the control signal tram the error detection unit, controls the first switch to be opened to disconnect the first wired communication line in response to the control signal, wherein the reception unit receives target data re-transmitted from the transmission apparatus via the second wired communication line using the second receiver if the first switch is disconnected from the first wired communication line.

2. The reception apparatus of claim 1, wherein the target data includes an integrity value generated by the transmission apparatus, and the error detection unit examines whether there is an error in the target data with reference to the integrity value.

3. The reception apparatus of claim 1, wherein the switchover unit controls the first switch to be opened by cutting off power supplied to the first switch.

4. The reception apparatus of claim 1, wherein the switchover unit controls the first switch to be opened by providing a function termination command to the first switch.

5. A transmission apparatus configured to transmit data in one direction to a reception apparatus, the transmission apparatus comprising: a first wired communication line; a second wired communication line; a transmission unit including a first transmitter connected to the first wired communication line and a second transmitter connected to the second wired communication line; a transmission data acquisition unit configured to acquire a first data which will be transmitted to the reception apparatus; an encoding unit configured to encode the first data together with an integrity value used for detecting an error in the first data and provide the encoded first data to at least one of the first and second transmitters; and a switchover sensing unit configured to sense whether the first wired communication line has been disconnected, wherein, when the switchover sensing unit senses that the first wired communication line has been disconnected, the transmission unit and the encoding unit perform operations for re-transmitting the first data to the reception apparatus via the second wired communication line, wherein the data is only unidirectionally transmitted from the transmission apparatus to the reception apparatus.

6. The transmission apparatus of claim 5, wherein the transmission data acquisition unit further acquires a second data which will be transmitted to the reception apparatus subsequent to the first data, when the switchover sensing unit senses that the first wired communication line has been disconnected, the encoding unit encodes combined data including the first data and the second data together with an integrity value used for detecting an error in the combined data, and the transmission unit transmits the encoded combined data to the reception apparatus via the second wired communication line.

7. The transmission apparatus of claim 5, wherein the switchover sensing unit includes a sensing circuit configured to sense an electrical signal of at least one of the first and second wired communication lines.

8. The transmission apparatus of claim 5, wherein the switchover sensing unit is implemented by providing functions of recognizing connection states of the first and second connections respectively to the first and second wired communication lines.

* * * * *